United States Patent [19]

Brunken

[11] 4,274,080

[45] Jun. 16, 1981

[54] MAGNETIC SECURITY SYSTEM

[75] Inventor: Gerd Brunken, Dittelbrunn, Fed. Rep. of Germany

[73] Assignee: Sachs-Systemtechnik GmbH, Schweinfurt, Fed. Rep. of Germany

[21] Appl. No.: 87,539

[22] Filed: Oct. 23, 1979

[30] Foreign Application Priority Data

Nov. 3, 1978 [DE] Fed. Rep. of Germany ....... 2847730

[51] Int. Cl.[3] ................................................ H04Q 9/00

[52] U.S. Cl. ............................ 340/149 R; 340/149 A; 340/543; 340/64

[58] Field of Search ....... 340/147 MD, 149 A, 149 R, 340/64, 543, 164 R; 235/382

[56] References Cited

U.S. PATENT DOCUMENTS 3,717,866 2/1973 Ehrlich ................................ 340/543
3,786,420 1/1974 Stambler .......................... 340/149 A
4,186,710 2/1980 Kilgore ................................. 340/64

*Primary Examiner*—Harold I. Pitts
*Attorney, Agent, or Firm*—Toren, McGeady and Stanger

[57] ABSTRACT

A magnetic security system is controlled by a magnetic key having magnetic devices defining an operating code which may be operatively interposed relative to a sensing device which will read the code defined on the key and will activate an electrical control system for delivering an electrical signal depending upon the code sensed upon the interposed key. The sensor device includes a code storage element and when the magnetic key is interposed relative to the sensor device, a comparison is drawn between the code on the key and the code programmed into the storage element. The storage element includes means for changing the code which is stored therein and lock means are provided to enable and disable changing of the code stored in the storage element.

5 Claims, 3 Drawing Figures

MAGNETIC SECURITY SYSTEM

BACKGROUND OF THE INVENTION

The present invention relates generally to security systems and, more particularly, to a security system utilizing a magnetic code sensing mechanism for actuating the system. The system of the invention may be utilized with alarm systems with electrically actuated lock mechanisms in order to emit an electrical signal which will either trigger an alarm or unlock the lock mechanism depending upon the code sensed by the precoded sensor which receives the coded magnetic key. The magnetic key of the invention is of the type containing a plurality of magnets formed in the arrangement of a locking or unlocking code. In the operation of devices of the types with which the invention relates, when the appropriate key having the magnetic devices thereon arranged in the predetermined order is inserted into the sensing device, a desired operative mode will be effected in the security system.

Magnetic switch devices of the type to which the invention relates have been proposed, for example, in U.S. Pat. Application Ser. No. 963,275. In magnetic switch devices of this type, the magnets of the magnetic key are arranged in code positions in the form of a grid or pattern which may be optionally arranged, with a magnetic field sensor being provided in a reading unit for each magnet position of the grid. The magnetic field sensors are connected to a comparator which delivers a switch signal when the magnetic field sensors sense a code on the magnetic key which coincides with a code stored in an adjustable code storage unit which is connected with the magnetic comparator. The switch signal of the comparator may be used for unlocking an electrically actuated lock which may be a component part of a central locking system, for example, of the type utilized in motor vehicles. However, the switch signal may also be utilized for triggering an alarm system when the code of the magnetic key sensed by the magnetic field sensors does not coincide with the code which has been stored in the code storage unit.

The locking code stored in the storage unit may always be manually caused to coincide with the code of the magnetic key. However, this property, which is a desirable property in itself, may result in disadvantages. For example, the storage unit could be reprogrammed to another locking code for the purposes of effecting a theft or perhaps merely due to carelessness. In the case of a theft, the motor vehicle which is tampered with in this manner may, of course, be eventually stolen without triggering the alarm system which is provided for the security of the vehicle. However, either in the case of a deliberate reprogramming for the purpose of a theft or inadvertent reprogramming, the magnetic switch lock will no longer be actuated by means of the magnetic key which is intended to appropriately operate the security system. When the magnetic switch lock is used for the central locking system of a motor vehicle, this may have the result that the operator of the motor vehicle may unintentionally lock himself out of the vehicle so that he can no longer gain access to the vehicle because of the inadvertently changed unlocking code.

Thus, the present invention is directed to providing a magnetic security system of the type described wherein the danger of unintentional or unauthorized reprogramming of the locking code is eliminated.

SUMMARY OF THE INVENTION

Briefly, the present invention may be described as a magnetic security system particularly suitable for use with alarm devices having electrically actuated lock mechanisms comprising magnetic key means having a plurality of magnetic devices defining an operating code, sensor means including magnetic sensors responsive to the magnetic devices of the magnetic key means operative to read the code defined on the key means when the key means is operatively interposed relative to the sensor means, code storage means operatively associated with the sensor means for storing information representative of a code and for releasing the sensor means when the magnetic key means bearing the code stored in the storage means is operatively interposed relative to the sensor means, and electrical control means operatively associated with the sensor means for delivering an electrical signal determined by the code on the key means sensed by the sensor means. The invention is particularly directed toward the provision of means for changing the code stored in the storage means which include lock means for enabling and disabling changes in the stored code.

Thus, the invention proceeds from the basic principle that there is provided an additional lock that may be locked by means of a key and which is assigned for operation with the code storage unit, this additional lock operating to secure the device for adjusting the code stored in the storage unit against inadvertent or unauthorized actuation. In this instance and in the following, the adjusting device is understood to be that member which allows or triggers a change of the locking code stored in the storage unit. The additional lock makes it possible that recoding of the storage unit may take place only in an authorized manner. Since for recoding operation the additional lock must initially be actuated and the storage unit then adjusted to a new locking code, the danger of unintentional alteration of the locking code is essentially eliminated.

In accordance with a basic operating feature of a system of the type to which the present invention relates, the locking code which is defined on the magnetic key of the system may be automatically stored into the storage unit by means of a reading unit. The storage unit is released by a reading control in order that the locking code on the magnetic key may be stored in the system. In a preferred development of the present invention, the additional lock of the invention is constructed as an electrical switch lock having switching contacts which are connected to the reading control of the storage unit which controls the reading of the locking code into the storage unit. This embodiment is of particular importance in motor vehicles since, in this case, the additional lock may be the ignition or the starting lock of the motor vehicle.

In order to increase the safeguards against unintentional recoding of the code storage means, a second lock or switch may be provided in the form of a push-button switch or the like. In this manner, the lock means may be comprised of two locks with one of the locks merely preparing for the release of the code storage means to enable the recoding to be effected while the other or second lock or switch operates as an additional safeguard. The switch contacts of the switch lock and the additional switch contact may be connected in series in the manner of an AND circuit.

In additional embodiments, the lock means of the invention may be constructed as a mechanical lock which may be manually actuated to enable adjustment of the coding of the security system. Manually actuated code adjustment may be provided, for example, in storage units for constant values. The reading-in member through which the code storage occurs may also be manually actuated switch contacts for release of the reading of the locking code into the storage unit.

In a preferred embodiment of the invention, a lock flap is considered particularly suitable for mechanically locking or securing the elements which are required to be operated in order to enable recoding of the code storage unit. The flap may be locked in position by means of a mechanical lock and it provides an additional factor to prevent unauthorized use of the security system.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
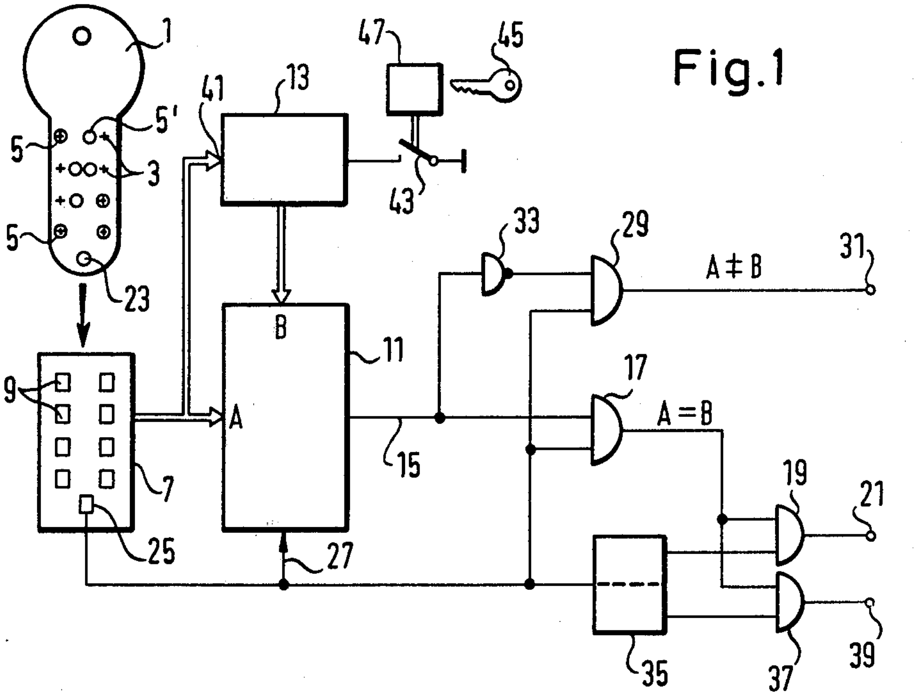
FIG. 1 is a schematic block diagram depicting a magnetic security system in accordance with the present invention.

Referring now to FIG. 1, there is shown in block diagram a magnetic security system in accordance with the invention which may be suitably used as the trigger mechanism for an alarm system or which may operate as the central locking system of a motor vehicle. The magnetic security system of the invention shown in FIG. 1 is operated by means of a magnetic key 1 which, when appropriately inserted in operative relationship with the system of FIG. 1 will be effective to unlock the system, assuming that the appropriate key has been utilized.

The magnetic key 1 contains a plurality of magnets 5 arranged in magnet positions 3, which positions are arranged in a grid pattern with the magnets 5 being arranged in a predetermined system in selected positions 3 depending upon the code which is to be utilized in operating the security system of FIG. 1. The positions 3 are indicated in FIG. 1 by crosses and the manner whereby the magnets 5 are arranged in the magnet positions 3 of the grid will determine the basic operating code of the security system.

When it is desired to operate the security system of the invention, the magnetic key 1 is inserted into a reading unit 7 which includes magnetic field sensors 9 located at each magnetic position 3 of the code grid. Each magnetic field sensor 9 will respond exclusively to the magnetic field of a magnet arranged in the magnetic position of the grid occupied by the particular field sensor 9. However, the field sensors 9 will not respond to the magnetic field of a magnet which is shifted in position from the predetermined position, as indicated by the displaced magnets 5′ shown in FIG. 1. The magnetic field sensors 9 are connected with a comparator 11 which compares a code signal A which is sensed by the magnetic field sensors 9 and developed from the reading of the magnetic key by the reading unit 7 with a locking code signal B which is emitted by an adjustable code storage unit 13.

When the code signals A and B coincide, the comparator 11 delivers a switching signal to an output control 21, the signal being delivered through a line 15, AND gate 17 and an AND gate 19.

The output control 21 may be used for unlocking an electrically actuated locking mechanism by application thereto of an electrical output signal at the output control 21.

The magnetic key 1 has permanently mounted thereon an additional magnet 23 which is intended to be sensed by a magnetic field sensor 25 of the reading unit 7. The magnetic field sensor 25 detects whether the magnetic key 1 is in the proper position relative to the reading unit 7, that is, whether it has been completely inserted into the reading unit 7 or whether the magnetic field sensors 9 coincide with the magnetic positions 3. The magnetic field sensor 25 is connected to a release input 27 of the comparator 11 and to the AND gate 17 which, therefore, accepts the switching signal from the comparator 11 only when the magnetic key is inserted correctly. Thus, if the magnet 23 is not sensed by sensor 25, the release signal will not be emitted from the sensor 25.

In the operation of the device, if the magnetic key is completely inserted into the reading unit 7 so that the release signal is emitted, but assuming that the code A of the magnetic key 1 does not coincide with the code B emitted from the storage unit 13, then an alarm signal will be triggered through the AND gate 29 which will energize an output 31 for the alarm system connected to the output 31. The AND gate 29 has supplied thereto the release signal from the magnetic field sensor 25. Additionally, the AND gate 29 has supplied thereto the signal on the line 15 which is applied to the AND gate 29 through a negator 33. The signal on the line 15 conducts a zero power level in the case where the code signals A and B do not coincide. Thus, where the signals A and B do not coincide while at the same time there is delivered to the AND gate 29 the release signal from the sensor 25, the AND gate 29 will open and the alarm will be triggered through the output 31.

The electrically actuated locking arrangement which is connected to the output 21 is opened by a signal applied through the output 21. The AND gate 19 through which the output 21 is energized is connected to the output of a flip-flop 35 which responds to changes in the state of the release signal emitted from the magnetic field sensor 25. The flip-flop 35 effectively switches the AND gate 19 when the magnetic key 1 is inserted into the reading unit 7 to its full extent so that the magnet 23 is sensed by the sensor 25. The other output of the flip-flop 35 is connected to an input of the AND gate 37 having another input which is connected to the AND gate 17. The AND gate 37 controls locking action of the lock mechanism which is also connected to the output 21. For this purpose, an output 39 is connected to the AND gate 37 to be energized thereby.

Thus, the locking mechanism (not shown) may be connected to both the outputs 21 and 39, with the locking mechanism being opened when an output signal is received at the output control 21 and with the locking mechanism being locked when an output signal is received at the output 39.

When the magnetic key 1 is inserted into the reading unit 7, the output signal A which is emitted from the reading unit 7 is not only applied to the comparator 11 but it is also applied to a reading input unit 41 of the code storage unit 13. Upon proper actuation of the code storage unit 13, the code signal A is entered into the unit 13 for storage. The code storage unit 13 includes a switch 43 which is a component part of a switch lock 47 which may be actuated by means of a key 45. When the security system of the present invention is used in connection with a motor vehicle, the ignition or starting lock of the motor vehicle may operate also as the switch lock 47 of the code storage unit 13. Under such circumstances, in order to enable the code stored in the storage unit 13 to be changed, and particularly, in order to enable the code which is represented on the magnetic key 1 to be stored into the storage unit 13, the switch lock 47 must be actuated by means of the key 45 while the magnetic key 1 is inserted into the reading unit 7. When this occurs, the code represented on the magnetic key 1 will be stored in the storage unit 13 and will be emitted as the code signal B when the magnetic key 1 is later inserted into the reading unit 7.

Thus, with the code on the magnetic key 1 stored in the storage unit 13, when the magnetic key 1 is inserted into the reading unit 7, the codes A and B will coincide thereby enabling desired and authorized operation of the security system.

However, it will be seen that it is only when the key 45 is inserted appropriately into the switch lock 47, that the desired code may be programmed into the storage unit 13. Failure to appropriately unlock the storage unit 13 in the manner described will prevent unauthorized or inadvertent changing or recoding of the storage unit 13.

Figure 2:
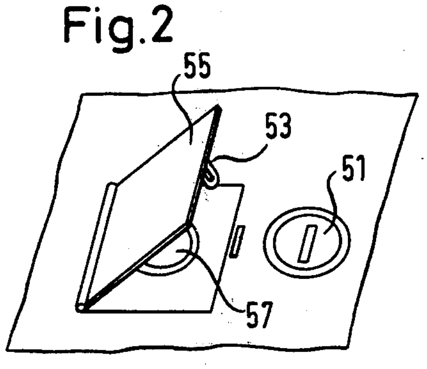
FIG. 2 is a schematic diagram showing a mechanical lock which may be used in the security system of FIG. 1 in order to prevent tampering with or unauthorized adjustment of the code storage unit.

A second embodiment of the lock means of the invention is shown in FIG. 2. The embodiment of FIG. 2 shows lock means which must be properly actuated in order to enable access to the code storage unit 13 for alteration of the code stored therein. The locking device of FIG. 2 includes means defining a key hole 51 with a flap 55 being provided to cover a contact or key button 57. The flap 55 includes a latch 53 which interacts with a mechanical lock which is operated by insertion of an appropriate key into the key hole 51. The flap 55 may be locked in a position in which it will cover the manually actuated contact or key button 57 in order to prevent access thereto by unauthorized persons. The contact button 57 essentially performs the same function as the switch contact 43 of the system shown in FIG. 1. By pressing the contact button 57, the code storage unit 13 may be placed in a condition wherein a new code may be stored therein in the manner previously described.

Figure 3:
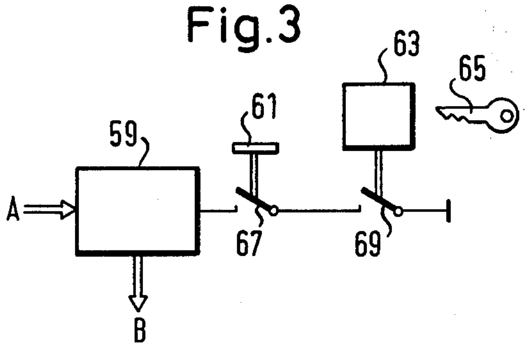
FIG. 3 is a schematic block diagram showing another system for preventing unauthorized recoding of the storage unit of the invention.

A further embodiment of the invention is illustrated in FIG. 3. In this embodiment, a code storage unit 59 storing the locking code corresponds in function with the code storage 13 of FIG. 1. The code storage unit 59 is released only when it is desired to read into the storage unit a new code. When it is desired to store into the storage unit 59 a code signal A, it is necessary not only to close a switch button 61 which may be manually actuated but there is also the requirement that a switch lock 63 be also unlocked by means of a key 65. The switch button 61 and the switch lock 63 control operation of serially connected switch contacts 67, 69 which upon joint actuation thereof will release the code storage unit 19 in order to enable storage therein of a new code A. The switch lock 63 may again be the ignition or starting lock of a automotive vehicle.

While specific embodiments of the invention have been shown and described in detail to illustrate the application of the inventive principles, it will be understood that the invention may be embodied otherwise without departing from such principles.

What is claimed is:

1. A magnetic security system particularly for alarm devices with an electrically actuated lock mechanism comprising: magnetic key means having a plurality of magnet devices defining an operating code; sensor means including magnetic sensors responsive to said magnetic devices operative to read a code defined on said key means when said key means is operatively interposed relative to said sensor means; code storage means operatively associated with said sensor means for storing information representative of a code and for releasing said sensor means when magnetic key means bearing a code stored in said storage means is operatively interposed relative to said sensor means; electrical control means operatively associated with said sensor means for delivering an electrical signal determined by the code on said key means sensed by said sensor means; and means for changing the code stored in said code storage means including lock means for enabling and disabling changes in said stored code; said lock means comprising a mechanical lock, an electrical contact operated by actuation of a push-button and a flap member operative to cover and uncover said push-button to prevent and enable access thereto, said mechanical lock operating to control said flap means.

2. A security system according to claim 1, wherein said lock means is an electrical switch lock having switch contacts connected to a programming control of said code storage means which operates to control changes in the code stored in said storage means, said programming control releasing said storage means for reprogramming of the locking code stored therein when said lock means is actuated.

3. A security system according to claim 1, which is connected for use in a motor vehicle wherein said lock means comprises the ignition lock of said motor vehicle.

4. A security system according to claims 2 or 3, wherein said lock means comprise a first and a second switch lock, said lock means operating so that both said first and said second switch locks must be properly actuated in order to enable changes in the code stored in said code storage means.

5. A security system according to claim 4, wherein said second switch lock includes a push-button switch operative to actuate a switch contact and wherein said first switch lock comprises a mechanical lock manually actuated by a key.

* * * * *